(12) United States Patent
Crump et al.

(10) Patent No.: US 7,942,987 B2
(45) Date of Patent: May 17, 2011

(54) SYSTEM AND METHOD FOR BUILDING THREE-DIMENSIONAL OBJECTS WITH METAL-BASED ALLOYS

(75) Inventors: S. Scott Crump, Wayzata, MN (US); J. Samuel Batchelder, Somers, NY (US); Timothy Sampson, Bloomington, MN (US); Robert L. Zinniel, Plymouth, MN (US); John Barnett, Bloomington, MN (US)

(73) Assignee: Stratasys, Inc., Eden Prairie, MN (US)

( * ) Notice: Subject to any disclaimer, the term of this patent is extended or adjusted under 35 U.S.C. 154(b) by 426 days.

(21) Appl. No.: 12/145,131

(22) Filed: Jun. 24, 2008

(65) Prior Publication Data
US 2009/0314391 A1 Dec. 24, 2009

(51) Int. Cl.
*C22F 1/00* (2006.01)
*B22D 46/00* (2006.01)

(52) U.S. Cl. ........ 148/522; 148/516; 148/523; 148/527; 148/535; 164/4.1; 164/457; 164/900; 222/591; 222/592; 222/593; 222/594

(58) Field of Classification Search ............... 148/516, 148/522, 523, 527, 535; 164/4.1, 457, 900; 219/76.1–76.17; 222/591–594; 266/236, 266/241

See application file for complete search history.

(56) References Cited

U.S. PATENT DOCUMENTS

| | | | |
|---|---|---|---|
| 556,472 A | 3/1896 | McCarroll | |
| 1,533,309 A | 4/1925 | Durborow | |
| 4,749,347 A | 6/1988 | Valavaara | |
| 5,109,589 A | 5/1992 | Cramer et al. | |
| 5,121,329 A | 6/1992 | Crump | |
| 5,141,680 A | 8/1992 | Almquist et al. | |
| 5,303,141 A | 4/1994 | Batchelder et al. | |
| 5,312,224 A | 5/1994 | Batchelder et al. | |
| 5,340,433 A | 8/1994 | Crump | |

(Continued)

FOREIGN PATENT DOCUMENTS

WO 99/37454 A1 7/1999

(Continued)

OTHER PUBLICATIONS

Finke, S.; Feenstra, F.K.: "Solid Freeform Fabrication by Extrusion and Deposition of Semi-Solid Alloys". Journal of Materials Science, Kluwer Academic Publishers, BO, vol. 37, No. 15, Aug. 1, 2002, pp. 3101-3106.

(Continued)

*Primary Examiner* — Stanley Silverman
*Assistant Examiner* — Brian Walck
(74) *Attorney, Agent, or Firm* — Brian R. Morrison; Westman, Champlin & Kelly, P.A.

(57) ABSTRACT

A digital manufacturing system comprises a build chamber, a build platform disposed within the build chamber, at least one extrusion line configured to heat a metal-based alloy up to a temperature between solidus and liquidus temperatures of the metal-based alloy, a deposition head disposed within the build chamber and configured to deposit the heated metal-based alloy onto the build platform in a predetermined pattern, an umbilical having a first end located outside of the build chamber and a second end connected to the deposition head, and at least one gantry assembly configured to cause relative motion between the build platform and the deposition head within the build chamber, where the at least one gantry assembly comprises a motor disposed outside of the build chamber.

15 Claims, 11 Drawing Sheets

U.S. PATENT DOCUMENTS

| | | | |
|---|---|---|---|
| 5,342,664 A | 8/1994 | Drotloff et al. | |
| 5,406,969 A | 4/1995 | Gray et al. | |
| 5,503,785 A | 4/1996 | Crump et al. | |
| 5,572,431 A | 11/1996 | Brown et al. | |
| 5,622,216 A | 4/1997 | Brown | |
| 5,656,230 A | 8/1997 | Khoshevis | |
| 5,764,521 A | 6/1998 | Batchelder et al. | |
| 5,816,466 A | 10/1998 | Seufer | |
| 5,866,058 A | 2/1999 | Batchelder et al. | |
| 5,900,207 A | 5/1999 | Danforth et al. | |
| 5,939,008 A | 8/1999 | Comb et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,027,326 A | 2/2000 | Cesarano, III et al. | |
| 6,054,077 A | 4/2000 | Comb et al. | |
| 6,067,480 A | 5/2000 | Stuffle et al. | |
| 6,085,957 A | 7/2000 | Zinniel et al. | |
| 6,214,279 B1 | 4/2001 | Yang et al. | |
| 6,238,613 B1 | 5/2001 | Batchelder et al. | |
| 6,257,517 B1 | 7/2001 | Babish et al. | |
| 6,547,995 B1 | 4/2003 | Comb | |
| 6,578,596 B1 | 6/2003 | Batchelder et al. | |
| 6,722,872 B1 | 4/2004 | Swanson et al. | |
| 6,814,907 B1 | 11/2004 | Comb | |
| 7,026,574 B2 | 4/2006 | Belfiore et al. | |
| 7,168,935 B1 | 1/2007 | Taminger et al. | |
| 2004/0188053 A1* | 9/2004 | Brice | 164/80 |
| 2006/0045787 A1* | 3/2006 | Jandeska et al. | 419/47 |
| 2007/0003656 A1 | 1/2007 | LaBossiere et al. | |
| 2007/0228590 A1 | 10/2007 | LaBossiere et al. | |

FOREIGN PATENT DOCUMENTS

| | | |
|---|---|---|
| WO | 99/37456 A1 | 7/1999 |
| WO | 00/78519 A1 | 12/2000 |

OTHER PUBLICATIONS

Cao, W.; Miyamoto, Y.: Freeform Fabrication of Aluminum Parts by Direct Deposition of Molten Aluminum. Journal of Materials Processing Technology, Elsevier, NL, vol. 173, No. 2, Apr. 10, 2006, pp. 209-212.

International Search Report & Written Opinion of Counterpart Application No. PCT/US2009/047736 Filed on Jun. 18, 2009.

AMS International, "Introduction to Aluminum-Silicon Casting Alloys", (10 pages), vol. 1; Aluminum-Silicon Casting Alloys: Atlas of Microfractographs; Materials Park, Ohio, USA, 2004.

Zhang, B., Zhao, D.Q., Pan M.X., Wang, W.H, Greer, A.L..., "Amorphous Metallic Plastic", Physical Review Letters, published May 23, 2005, (4 pages) PRL 94, 205502 (2005), The American Physical Society College Park, MD, USA.

Murthy, N. S., Minor H., Akkapeddi, M.K., Van Buskirk, B., "Characterization of Polymer Blends and Alloys be Constrained Profile—Analysis of X-Ray Diffraction Scans", accepted Jan. 2, 1990, (8 pages), Journal of Applied Polymer Science, vol. 41, 2265-2272 (1990), John Wiley & Sons, Inc., USA.

* cited by examiner

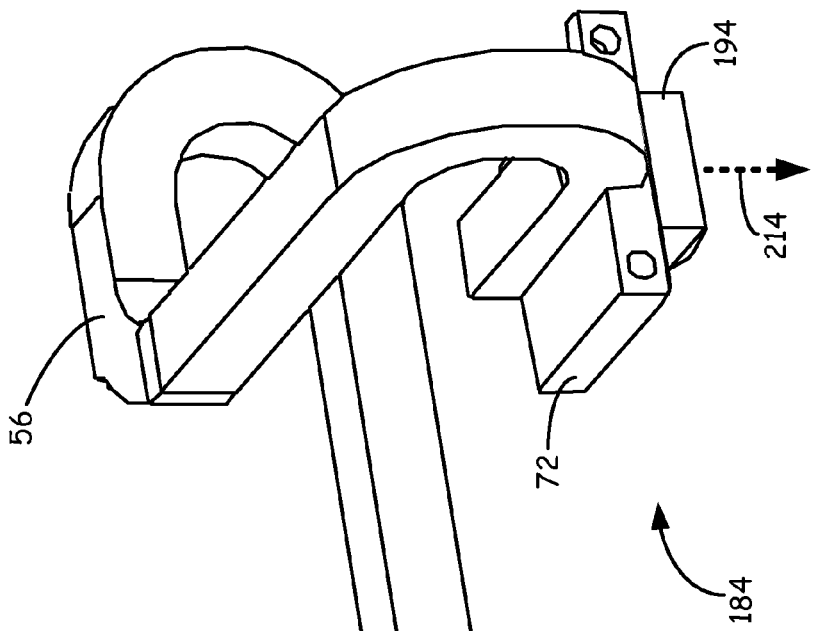
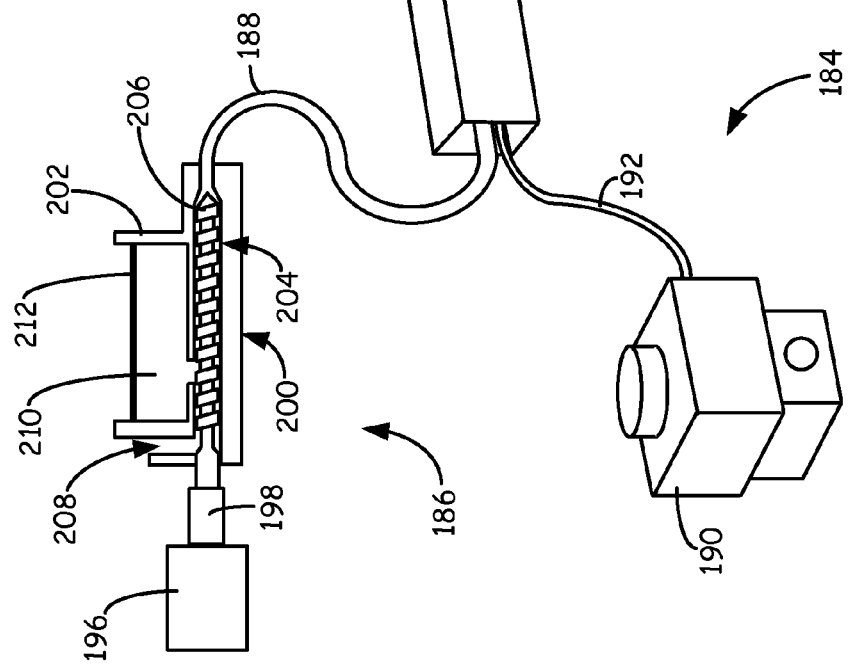
FIG. 8

SYSTEM AND METHOD FOR BUILDING THREE-DIMENSIONAL OBJECTS WITH METAL-BASED ALLOYS

BACKGROUND

The present invention relates to systems and methods for building three-dimensional (3D) objects in digital manufacturing systems. In particular, the present invention relates to high-temperature, extrusion-based digital manufacturing systems for building 3D object metal-based alloys.

An extrusion-based digital manufacturing system (e.g., fused deposition modeling systems developed by Stratasys, Inc., Eden Prairie, Minn.) is used to build a 3D object from a computer-aided design (CAD) model in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D object resembling the CAD model.

Movement of the extrusion head with respect to the substrate is performed under computer control, in accordance with build data that represents the 3D object. The build data is obtained by initially slicing the CAD model of the 3D object into multiple horizontally sliced layers. Then, for each sliced layer, the host computer generates a build path for depositing roads of modeling material to form the 3D object.

In fabricating 3D objects by depositing layers of modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D object being formed. Support material is then deposited from a second nozzle pursuant to the generated geometry during the build process. The support material adheres to the modeling material during fabrication, and is removable from the completed 3D object when the build process is complete.

A common interest of consumers in the industry of digital manufacturing is to increase the physical properties of the 3D objects, such as part strengths and durability. One category of materials that could provide such increased physical properties include metal-based alloys. For example, 3D objects built from high-strength metals may exhibit tensile strengths that are substantially greater than those of industrial thermoplastic materials. However, the extrusion of metal-based alloys poses several issues for digital manufacturing. For example, the extrusion of metal-based alloys requires high operating temperatures, which may undesirably affect performance of current digital manufacturing systems. Furthermore, heating a metal-based alloy to a temperature above its liquidus temperature may prevent the alloy from having a sufficient viscosity for extrusion, and may undesirably affect its grain structure upon re-solidification (e.g., dendrite formation). Thus, there is an ongoing need for systems and methods for build 3D objects from metal-based alloys with digital manufacturing techniques.

SUMMARY

The present invention relates to a digital manufacturing system for building a three-dimensional object with a metal-based alloy. The system includes a build chamber configured to be maintained at one or more elevated temperatures, a build platform disposed within the build chamber, at least one extrusion line configured to heat the metal-based alloy up to a temperature between the solidus and liquidus temperatures of the metal-based alloy, a deposition head disposed within the build chamber and configured to deposit the heated metal-based alloy onto the build platform in a predetermined pattern, an umbilical having a first end located outside of the build chamber and a second end connected to the deposition head, and at least one gantry assembly configured to cause relative motion between the build platform and the deposition head within the build chamber, where the at least one gantry assembly includes a motor disposed outside of the build chamber. The present invention also relates to a method for building a three-dimensional object from a metal-based alloy with a digital manufacturing system.

BRIEF DESCRIPTION OF THE DRAWINGS

FIG. 8 is a front perspective view of a third alternative extrusion head of the digital manufacturing system in use with an umbilical of the digital manufacturing system, where the third alternative extrusion head has a hybrid screw pump/freeze valve design.

DETAILED DESCRIPTION

Figure 1:
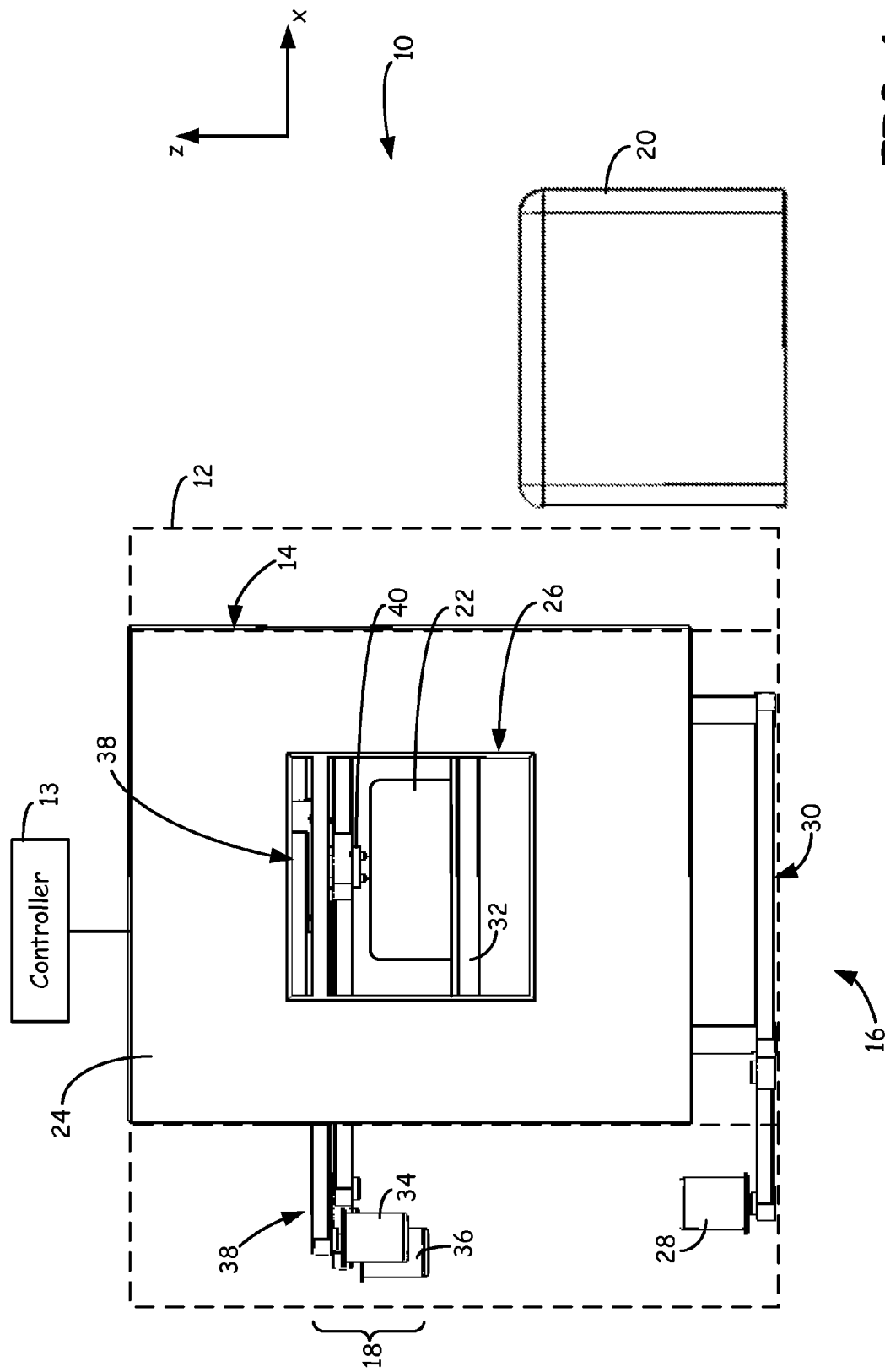
FIG. 1 is a front view of a digital manufacturing system for building 3D objects with metal-based alloys.

FIG. 1 is a front perspective view of system 10, which is a high-temperature, digital manufacturing system for building 3D objects with metal-based alloys. As shown, system 10 includes housing 12 (shown with broken lines), controller 13, build chamber 14, platform assembly 16, head assembly 18, and quench tank 20. Housing 12 is the exterior housing of system 10, which protects the internal components of system 10 from external conditions. System 10 also includes support frames (not shown) for retaining build chamber 14, platform assembly 16, and head assembly 18 within housing 12 at the respective locations shown in FIG. 1. Controller 13 is a computer-operated controller that receives source geometries of 3D objects (e.g., CAD models in .STL formats), and converts the received source geometries into sequences of processing steps that system 10 performs to build the 3D objects. Accordingly, controller 13 provides control signals to system 10, and may be an integral component of system 10 or external to system 10.

Build chamber 14 is an enclosed, high-temperature environment in which 3D objects (represented as 3D object 22 in FIG. 1) are built with one or more metal-based alloys. Build chamber 14 desirably functions as a high-temperature oven, and is desirably maintained at one or more elevated temperatures to reduce the risk of mechanically distorting (e.g., curling) 3D object 22, and to decrease shrinkage due to the thermal expansion coefficient of the metal-based alloy. The temperature of build chamber 14 may be elevated through the use of electrical and/or flame-based mechanisms using timed thermal ramping cycles.

The elevated temperature of build chamber 14 desirably ranges from the solidification temperature of the metal-based alloy to the creep relaxation temperature of the metal-based alloy. As used herein, the term "creep relaxation temperature" of the metal-based alloy refers to a temperature at which the stress relaxation modulus of the alloy is 10% relative to the stress relaxation modulus of the alloy at the solidification temperature of the alloy, where the stress relaxation modulus is measured pursuant to ASTM E328-02. Examples of suitable elevated temperatures for build chamber 14 range from about 200° C. to about 800° C., with particularly suitable temperatures ranging from about 400° C. to about 700° C., and with even more particularly suitable temperatures ranging from about 500° C. to about 650° C.

The elevated temperature of build chamber 14 may also exhibit multiple temperature zones. For example, the temperature at the deposition site may be above the solidification temperature of the metal based alloy (e.g., below or about even with the creep relaxation temperature of the metal-based alloy), while the remainder of build chamber 14 may be below the solidification temperature of the metal based alloy (e.g., within 20° C. below the solidification temperature of the metal based alloy). This prevents the temperature gradient within build chamber 14 from generating significant stresses on 3D object 22 while cooling.

Furthermore, the elevated temperature within build chamber 14 is desirably monitored with one or more process control loops to maintain the desired temperature(s) during the build operations. Temperature monitoring is desirable in part because metal-based alloys typically have high thermal conductivities, and therefore, radiate high amounts of heat when cooling from the extrusion temperatures to the temperature of build chamber 14.

Build chamber 14 is also desirably purged of oxygen (e.g., air) prior to a build operation, and may contain a non-oxidizing gas and/or vacuum conditions. For example, build chamber 14 may be vented to the atmosphere, and purged with an inert gas (e.g., nitrogen, helium, argon, and xenon). Additionally, build chamber 14 may be connected to a vacuum line (not shown) to reduce the pressure to vacuum conditions. Examples of suitable vacuum pressures for performing the build operation include about 13 millipascals (about $10^{-4}$ Torr) or less, with more particularly suitable pressures including about 1.3 millipascals (about $10^{-5}$ Torr) or less. The reduced pressure may also be used in combination with the inert gas. In embodiments in which inert gases are used, the atmosphere within build chamber 14 is desirably re-circulated to maintain temperature uniformity, and may be vented externally after the build operation is complete.

Build chamber 14 includes chamber walls 24, which are the lateral, ceiling, and base walls of build chamber 14, and are desirably fabricated from one or more thermally-insulating materials capable of withstanding the elevated temperatures of build chamber 14. Suitable materials for chamber walls 24 include heat-resistant and low-thermal expansion materials, such as refractory ceramic firebricks, silica firebricks, high-temperature alloys and superalloys, and combinations thereof. Chamber walls 24 include access opening 26, which allows access within build chamber 14 before and after build operations. Access opening 26 is desirably secured with a door (not shown) during the build operations to maintain temperature uniformity within build chamber 14.

Platform assembly 16 includes drive motor 28, z-axis gantry 30, and build platform 32. Drive motor 28 is a motor (e.g., a direct-current motor) disposed outside of chamber walls 24 of build chamber 14, and is in signal communication with controller 13. Drive motor 28 is also engaged with z-axis gantry 30, which allows drive motor 28 to operate z-axis gantry 30 based on signals received from controller 13. Z-axis gantry 30 engages with drive motor 28 outside of build chamber 14, and extends through chamber walls 24 for retaining build platform 32. As discussed below, z-axis gantry 30 is configured to move build platform 32 along a vertical z-axis within build chamber 14 based on rotational power supplied by drive motor 28. Build platform 32 is a substrate on which 3D object 22 (and any corresponding support structure, not shown) is built, and is movably retained within build chamber 14 by z-axis gantry 30. Suitable materials for build platform 32 include materials capable of use in the elevated temperature of build chamber 14, and that are compatible with the metal-based alloy of 3D object 22. Examples of suitable materials for build platform 32 include nickel-based alloys and superalloys, graphites, ceramics, carbides (e.g., silicon carbides) and combinations thereof.

Head assembly 18 includes drive motors 34 and 36, x-y-axis gantry 38, and extrusion head 40. Drive motors 34 and 36 are motors (e.g., direct-current motors) disposed outside of chamber walls 24 of build chamber 14, and are also in signal communication with controller 13. Drive motors 34 and 36 are also engaged with x-y-axis gantry 38, which allows drive motors 34 and 36 to operate x-y-axis gantry 38 based on signals received from controller 13. X-y-axis gantry 38 engages with drive motors 34 and 36 outside of build chamber 14, and extends through chamber walls 24 for retaining extrusion head 40. Extrusion head 40 is retained within build chamber 14, and is the portion of system 10 that deposits the metal-based alloy (and corresponding support material) in a predetermined pattern onto build platform 32 to build 3D object 22 (and corresponding support structure) in a layer-by-layer manner.

As discussed below, x-y-axis gantry 38 is configured to move extrusion head 40 in a horizontal x-y plane within build chamber 14 based on rotational power supplied by drive motors 34 and 36, where the x-axis, the y-axis (not shown in FIG. 1), and the z-axis are orthogonal to each other. In an alternative embodiment, platform assembly 16 may be configured to move in the horizontal x-y plane within build chamber 14, and head assembly 18 may be configured to move along the vertical z-axis. Other similar arrangements may also be used such that one or both of build platform 32 and extrusion head 40 are moveable relative to each other, and such that the drive motors (e.g., drive motors 28, 34, and 36) are disposed outside of chamber walls 24 of build chamber 14. Positioning drive motors 28, 34, and 36 outside of chamber walls 24 thermally isolates drive motors 28, 34, and 36 from the elevated temperature of build chamber 14. This reduces the risk of damaging drive motors 28, 34, and 36, thereby preserving their operational lives. In one embodiment, coolant gases (e.g., inert gases) are relayed to one or more locations within housing 12 (outside of chamber walls 24) to further thermally isolate drive motors 28, 34, and 36 from the elevated temperature of build chamber 14.

During a build operation, build chamber 14 is substantially purged of oxidizing gases (e.g., purging with argon and/or vacuum), and is then heated to one or more elevated temperatures. Controller 13 then directs drive motors 34 and 36 to move extrusion head 40 around within build chamber 14 in the horizontal X-Y plane via x-y-axis gantry 38. Controller 13 also directs extrusion head 40 to extrude the metal-based alloy onto build platform 32 in a pattern based on the movement of extrusion head 40, thereby forming a layer of 3D object 22. As discussed below, the metal-based alloy is desirably heated to a semi-solid phase of the alloy (i.e., between the solidus and liquidus temperatures). This creates a slush-like consistency for the metal-based alloy, which provides a viscosity that is suitable for extrusion. As further discussed below, the metal-based alloy is also desirably kept below the liquidus temperature of the alloy to substantially preserve the grain structure of the raw material alloy wire during deposition and re-solidification. This is beneficial for preserving the physical properties of the original grain structure of the metal-based alloy, and is particularly suitable for use with metal-based alloys that are heat treated prior to use with system 10.

When the layer is complete, the computer-operated controller then directs drive motor 28 to lower build platform 32 along the z-axis by a single layer increment via z-axis gantry 30. This allows the subsequent layer of 3D object 22 to be built. These steps may then be repeated until 3D object 22 and any corresponding support structure are complete. After the build operation is complete, 3D object 22 may be stabilized to a uniform temperature prior to removal from build chamber 14 and immersed into quench media. Quench tank 20 is a tank disposed outside of housing 12, and provides a fluid (e.g., warm water) to quench 3D object 22 after the build operation. The quenching process is desirably performed within a short time period after 3D object 22 is thermally stabilized to prevent lower-temperature, solid solubility changes from occurring. This preserves the desired solid solution qualities of 3D object 22. Accordingly, quench tank 20 is desirably located adjacent to housing 12 to allow 3D object 22 to be readily quenched after the build operation is complete. In one embodiment, quench tank 20 is also disposed in an inert gas atmosphere to further reduce the risk of oxidizing 3D object 22 during the quenching process. After the quenching process is complete, 3D object 22 may then undergo one or more post-build operations (e.g., tempering and precipitation hardening processes).

Figure 2:
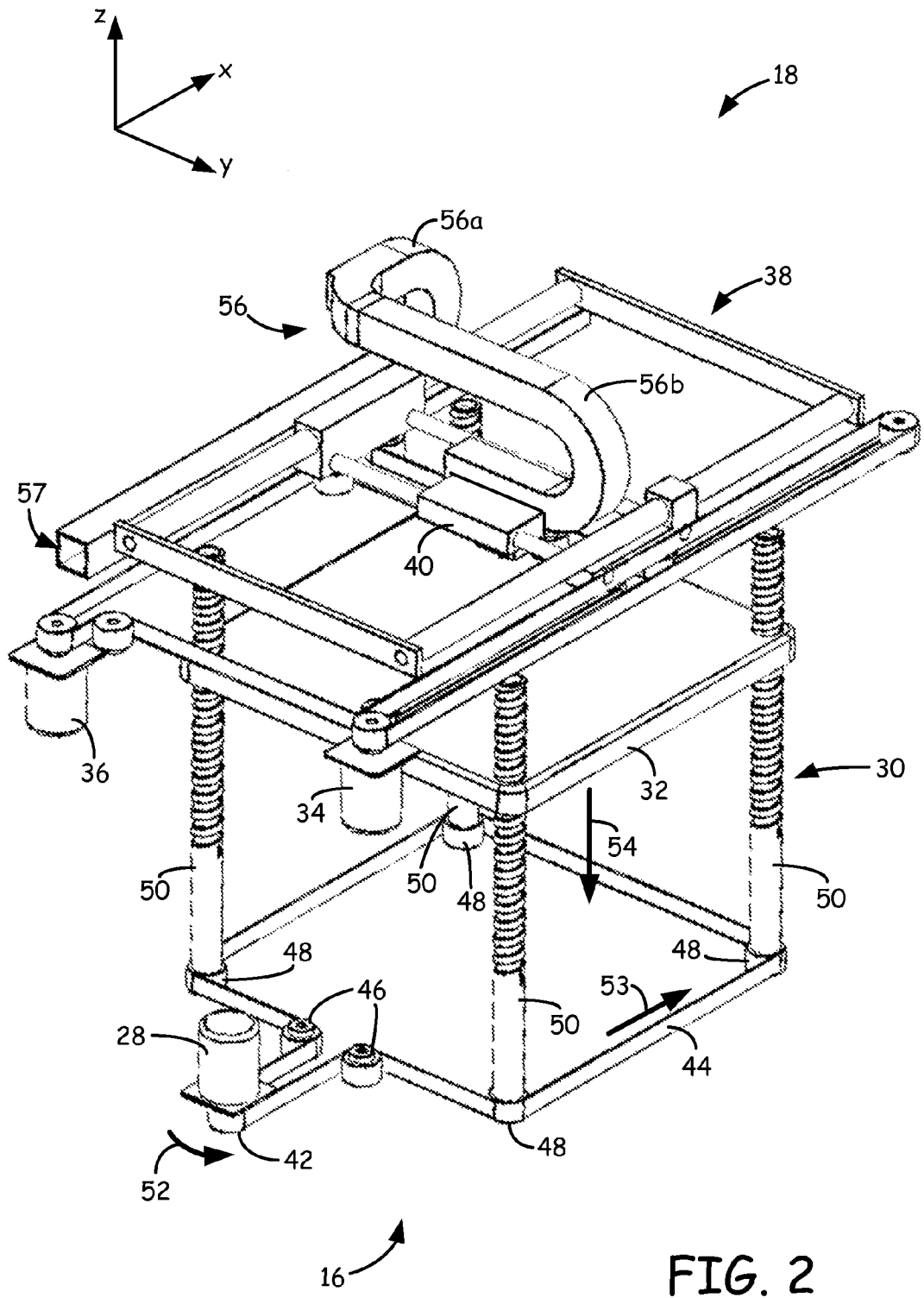
FIG. 2 is a front perspective view of a platform assembly and head assembly of the digital manufacturing system.

FIG. 2 is a front perspective view of platform assembly 16 and head assembly 18, where housing 12, controller 13, quench tank 20, 3D object 22, and chamber walls 24 are omitted for ease of discussion. The arrangement of platform assembly 16 and head assembly 18 reduces the exposure of temperature-sensitive components (e.g., drive motors 28, 34, and 36) to the elevated temperatures of build chamber 14 (shown in FIG. 1). As shown in FIG. 2, z-axis gantry 30 of platform assembly 16 includes drive pulley 42, drive belt 44, tensioner pulleys 46, idler pulleys 48, and lead screws 50. Drive pulley 42 is a rotatable pulley that is axially connected to drive motor 28, and relays rotational power of drive motor 28 to drive belt 44. Drive belt 44 is a belt engaged with drive pulley 42, tensioner pulleys 46, and idler pulleys 48, which transfers the rotational power of drive pulley 42 to idler pulleys 48.

Tensioner pulleys 46 are adjustable pulleys for tightening the engagement of drive belt 44 with drive pulley 42 and idler pulleys 48 during assembly of z-axis gantry 30. Idler pulleys 48 are pulleys that are axially engaged with lead screws 50, thereby allowing the rotation of idler pulleys 48 to correspondingly rotate lead screws 50. In the embodiment shown in FIGS. 1 and 2, drive pulley 42, drive belt 44, tensioner pulleys 46, and idler pulleys 48 are located outside of chamber walls 24. As such, drive pulley 42, drive belt 44, tensioner pulleys 46, and idler pulleys 48 are also thermally isolated from build chamber 14, and may be fabricated from a variety of materials (e.g., metals, plastics, and ceramics). In an alternative embodiment, one or more of drive belt 44, tensioner pulleys 46, and idler pulleys 48 may be located within chamber walls 24, thereby exposing the components to the components to the elevated temperature of build chamber 14. In this embodiment, drive pulley 42, drive belt 44, tensioner pulleys 46, and idler pulleys 48 are desirably fabricated from materials capable of use in the elevated temperature of build chamber 14. For example, drive belt 44 may be fabricated from one or more nickel-based alloys and superalloys, such as γ' (gamma prime) and γ" (gamma double prime) strengthened superalloys commercially available under the trademark "INCONEL" from Special Metals Corporation, New Hartford, N.Y. (e.g., "INCONEL 718" alloy and "INCONEL 939" alloy).

Lead screws 50 are screws threadedly engaged with build platform 32 for translating the rotational motion of lead screws 50 into linear motion of build platform 32 along the vertical z-axis. During a build operation, controller 13 signals drive motor 28 to rotate drive pulley 42 in a first rotational direction (represented by arrow 52). This pulls drive belt 44 around drive pulley 42, tensioner pulleys 46, and idler pulleys 48 in the same rotational direction as drive pulley 42 (represented by arrow 53), thereby rotating idler pulleys 48 and lead screws 50 in the same rotational direction. The rotation of lead screws 50 causes build platform 32 to lower along the vertical z-axis (represented by arrow 54) due to the threaded engagement, until controller 13 signals drive motor 28 to halt the rotation. This arrangement allows build platform 32 to be raised and lowered, while also thermally isolating drive motor 28 from build chamber 14.

As further shown in FIG. 2, head assembly 18 also includes umbilical 56, which is a double-tray baffle that extends through chamber wall 24 and connects with extrusion head 40. Umbilical 56 is a thermally-insulative pathway that provides the metal-based alloy, support material, coolant air, and electrical connections to extrusion head 40, where the entrance of umbilical 56 (represented as entrance 57) is located outside of chamber walls 24. Pressurized coolant air may also be relayed through umbilical 56 to further reduce the temperature in the interior region of umbilical 56, and the interior region of umbilical 56 is desirably maintained at a temperature below about 200° C. to protect the above-discussed components disposed within umbilical 56.

Umbilical 56 includes x-axis bellows 56a and y-axis bellows 56b, which are metal-lined bellows that thermally isolate the interior region of umbilical 56 from the elevated temperature of build chamber 14. As shown, x-axis bellows 56a is configured to curl along the x-axis in response to movement of extrusion head 40 along the x-axis. Similarly, y-axis bellows 56b is the portion of umbilical 56 that connects to extrusion head 40, and is configured to curl along the y-axis in response to movement of extrusion head 40 along the y-axis. This double-tray arrangement for umbilical 56 allows extrusion head 40 to move around in the horizontal x-y plane without substantial resistance, while also allowing umbilical 56 to retain a wall thickness that is sufficient to thermally isolate the interior region of umbilical 56.

Figure 3:
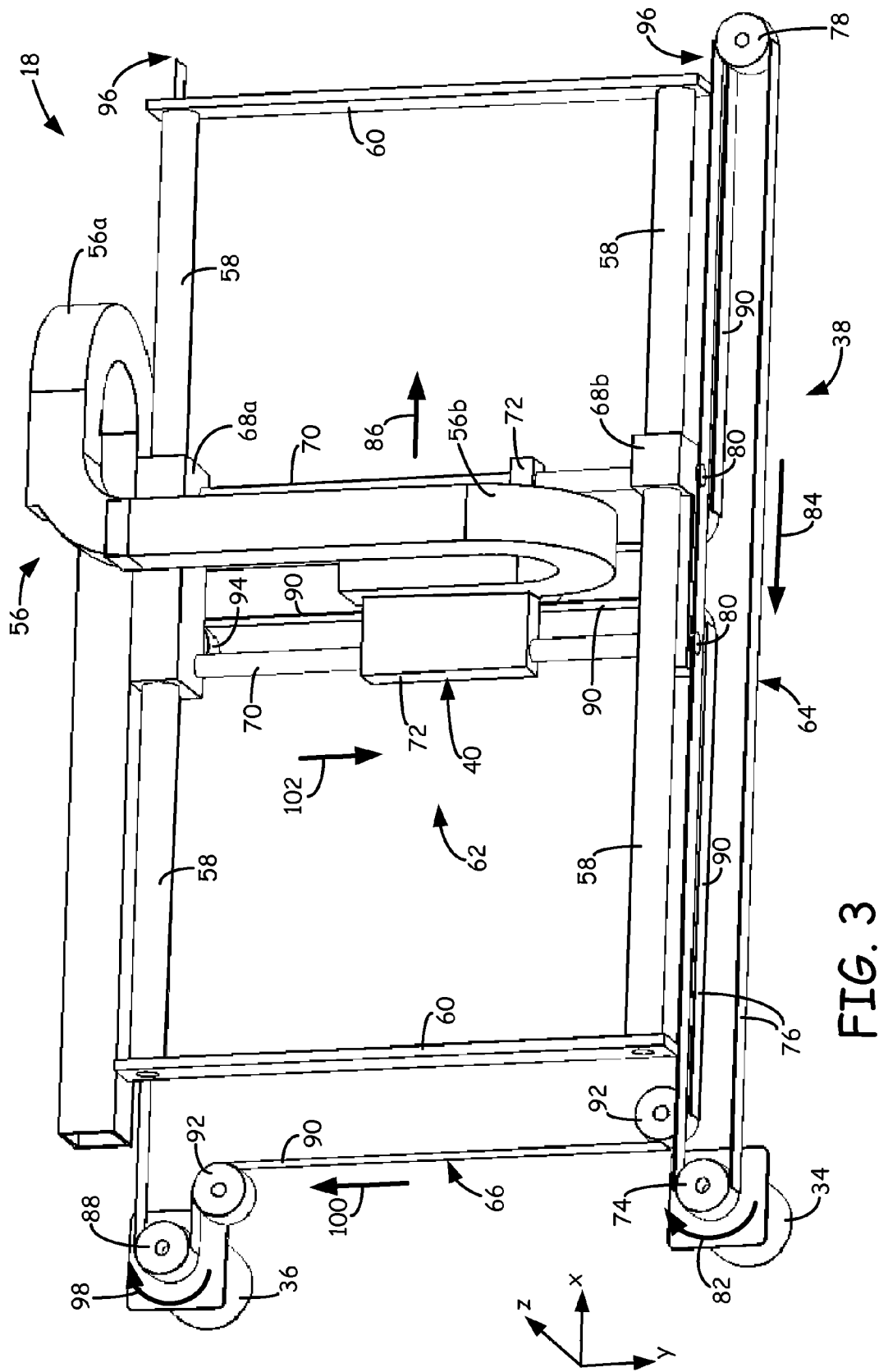
FIG. 3 is a top perspective view of the head assembly of the digital manufacturing system.

FIG. 3 is a top perspective view of head assembly 18, further illustrating the engagements between drive motors 34 and 36, x-y-axis gantry 38, extrusion head 40, and umbilical 56. As shown, x-y-axis gantry 38 includes x-axis guide rails 58, rail offsets 60, y-axis bridge 62, x-axis belt mechanism 64, and y-axis belt mechanism 66. X-axis guide rails 58 are a first pair of rails that extend along the x-axis within build chamber 14, and have opposing ends secured to rail offsets 60, where rail offsets 60 ensure that x-axis guide rails 58 maintain a parallel arrangement. In one embodiment, rail offsets 60 are secured to chamber walls 24 (shown in FIG. 1). Alternatively, x-axis guide rails 58 may extend through chamber walls 24, such that rail offsets 60 are secured to a support frame of system 10 within housing 12 (shown in FIG. 1). Suitable materials for x-axis guide rails 58 include materials suitable for use in the elevated temperature of build chamber 14 (shown in FIG. 1), such as graphite-metal blends commercially available under the trademark "GRAPHALLOY" from Graphite Metallizing Corporation, Yonkers, N.Y.

Y-axis bridge 62 includes bearing sleeves 68a and 68b, and y-axis guide rails 70. Bearing sleeves 68a and 68b are support bearings that are slidably retained by x-axis guide rails 58. This allows y-axis bridge 62 to slide along the x-axis. Suitable materials for bearing sleeves 68a and 68b include materials the have reduced friction with x-axis guide rails 58, and that are suitable for use in the elevated temperature of build chamber 14. Examples of suitable materials for bearing sleeves 68a and 68b include graphite-metal blends, such as those discussed above for x-axis guide rails 58. Y-axis guide rails 70 are a second pair of rails that extend along the y-axis within build chamber 14, and have opposing ends secured to bearing sleeves 68a and 68b. Suitable materials for y-axis guide rails 70 also include graphite-metal blends, such as those discussed above for x-axis guide rails 58.

Extrusion head 40 includes bearing sleeves 72, which are support bearings slidably retained by y-axis guide rails 70. This allows extrusion head 40 to slide along the y-axis. Suitable materials for bearing sleeves 72 also include graphite-metal blends, such as those discussed above for x-axis guide rails 58.

X-axis belt mechanism 64 is the portion of x-y-axis gantry 38 that engages with drive motor 34 to move y-axis bridge 62 along the x-axis. As shown, x-axis belt mechanism 64 includes drive pulley 74, drive belt 76, and tensioner pulley 78. Drive pulley 74 is a rotatable pulley that is axially connected to drive motor 34, and relays rotational power of drive motor 34 to drive belt 76. Drive pulley 74 is also located outside of chamber walls 24. As such, drive pulley 74 is also thermally isolated from build chamber 14, and may be fabricated from a variety of materials (e.g., metals, plastics, and ceramics).

Drive belt 76 is a metal belt engaged with drive pulley 74 and tensioner pulley 78, which allows the rotation of drive pulley 74 to rotate drive belt 76. Suitable materials for drive belt 76 include those discussed above for drive belt 44 (shown in FIG. 2), such as such as γ' (gamma prime) and γ" (gamma double prime) strengthened superalloys commercially available under the trademark "INCONEL" from Special Metals Corporation, New Hartford, N.Y. (e.g., "INCONEL 718" alloy and "INCONEL 939" alloy).

Tensioner pulley 78 is an adjustable pulley for tightening the engagement of drive belt 76 with drive pulley 74 during assembly of x-axis belt mechanism 64. In the embodiment shown in FIGS. 1-3, tensioner pulley 78 is disposed within chamber walls 24, and is exposed to the elevated temperatures of build chamber 14. In this embodiment, tensioner pulley 78 is desirably fabricated from a material capable of use in the elevated temperature (e.g., high-temperature metals and ceramics). In an alternative embodiment, drive belt 76 may extend through chamber walls 24 such that tensioner pulley 78 is secured to a support frame of system 10 within housing 12.

As further shown in FIG. 3, drive belt 76 is secured to bearing sleeve 68b with fasteners 80. With this arrangement, the rotation of drive belt 76 pulls y-axis bridge 62 along the x-axis based on the rotation of drive motor 34, thereby moving extrusion head 40 along the x-axis. For example, when drive motor 34 rotates drive pulley 74 in a first rotational direction (represented by arrow 82), drive belt 76 rotates around drive pulley 74 and tensioner pulley 78 in the same rotational direction (represented by arrow 84). This correspondingly pulls y-axis bridge 62 along the x-axis in a direction that is away from drive motors 34 and 36 (represented by arrow 86). Alternatively, when drive motor 34 rotates drive pulley 74 in the opposing rotational direction to arrow 82, drive belt 76 pulls y-axis bridge 62 along the x-axis in the opposing direction to arrow 86.

Y-axis belt mechanism 66 is the portion of x-y-axis gantry 38 that engages with drive motor 36 to move extrusion head 40 along the y-axis. As shown, y-axis belt mechanism 66 includes drive pulley 88, drive belt 90, tensioner pulleys 92, and idler pulleys 94 (a single idler pulley 94 is shown in FIG. 3). Drive pulley 88 is a rotatable pulley that is axially connected to drive motor 36, and relays rotational power of drive motor 36 to drive belt 90. As shown, drive pulley 78 is located outside of chamber walls 24, and is thermally isolated from build chamber 14. Drive belt 90 is a metal belt engaged with drive pulley 88, tensioner pulley 92, and idler pulleys 94, which allows the rotation of drive pulley 88 to pull drive belt 90 in the rotational direction of drive pulley 88. Suitable materials for drive belt 90 include those discussed above for drive belt 76.

Tensioner pulleys 92 are adjustable pulleys for tightening the engagement of drive belt 76 with drive pulley 74 during assembly of x-axis belt mechanism 64. As shown, tensioner pulleys 92 are also located outside of chamber walls 24, and are desirably fabricated from materials capable of withstanding the thermally-conductive contact with drive belt 90. Idler pulleys 94 are rotatable pulleys axially secured to bearing sleeves 68a and 68b, and are engaged with drive belt 90. As shown, idler pulleys 94 are located within chamber walls 24. As a result, idler pulleys 94 are desirably fabricated from materials capable of use in the elevated temperature of build chamber 14 (e.g., high-temperature metals and ceramics).

The ends of drive belt 90 (represented as belt ends 96) are secured to a fixed surface (not shown), thereby preventing drive belt 90 from being fully rotatable as discussed above for drive belt 44 (shown in FIG. 2) and drive belt 76. In one embodiment, chamber walls 24 (shown in FIG. 1) function as the fixed surface for retaining belt ends 96. Alternatively, drive belt 90 may extend through chamber walls 24, such that belt ends 96 are secured to a support frame of system 10 within housing 12. During a build operation, drive motor 36 rotates drive pulley 88 in a first rotational direction (represented by arrow 98), which pulls drive belt 90 around drive pulley 88 and tensioner pulleys 92 in the same rotational direction (represented by arrow 100). As discussed below, this pulls extrusion head 40 along the y-axis, toward bearing sleeve 68a (represented by arrow 102). Alternatively, when drive motor 36 rotates drive pulley 88 in the opposing rotational direction to arrow 98, drive belt 90 pulls extrusion head 40 along the y-axis in the opposing direction to arrow 102.

Figure 4:
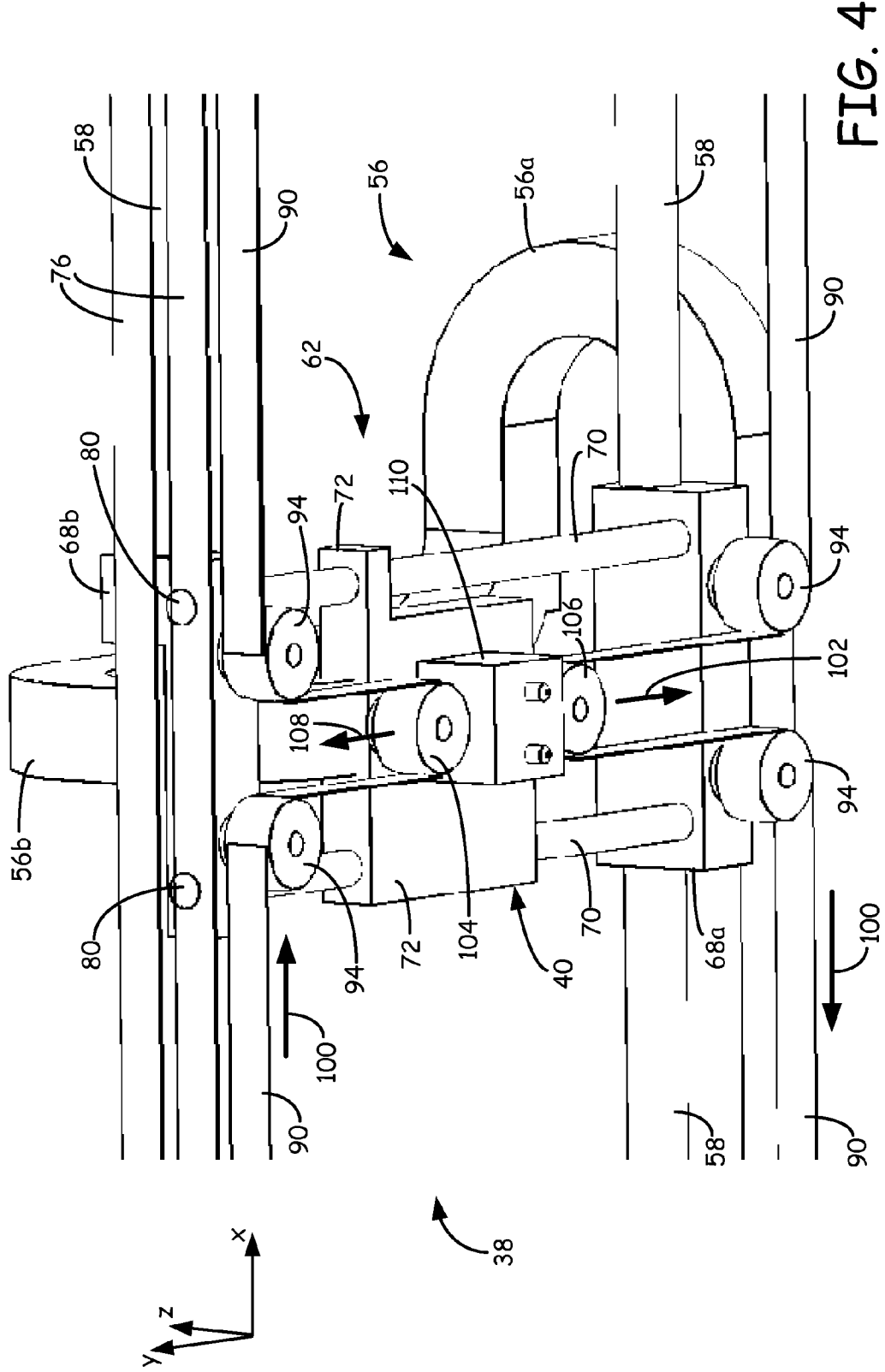
FIG. 4 is a bottom front perspective view of an x-y-axis gantry and an extrusion head of the digital manufacturing system.

FIG. 4 is a bottom front perspective view of x-y-axis gantry 38 and extrusion head 40, further illustrating the engagement between extrusion head 40 and y-axis belt mechanism 66. As shown, idler pulleys 94 are axially secured to bearing sleeves 68a and 68b of y-axis bridge 62, and y-axis belt mechanism 66 further includes idler pulleys 104 and 106 axially secured to extrusion head 40 and engaged with drive belt 90. As discussed above, belt ends 96 (shown in FIG. 3) of drive belt 90 are secured to fixed locations. As such, rotation of drive pulley 88 (shown in FIG. 3) in the rotational direction of arrow 98 (shown in FIG. 3) pulls drive belt 90 in the rotational direction of arrow 100. This correspondingly reduces tension on idler pulley 104 and pulls idler pulley 106 (and correspondingly extrusion head 40) in the direction of arrow 102. Alternatively, if drive pulley 88 rotates in the opposing rotational direction to arrow 98, drive belt 90 is pulled in the opposing rotational direction to arrow 100, which reduces tension on idler pulley 106, and pulls idler pulley 104 (and correspondingly extrusion head 40) in the direction of arrow 108 (i.e., opposite of arrow 102). Accordingly, the use of x-y-gantry 28 allows extrusion head 40 to be moved around the horizontal x-y plane within build chamber 14 based on the control signals provided by controller 13 (shown in FIG. 1).

As further shown in FIG. 4, extrusion head 40 also includes liquefier portion 110, which includes a pair of liquefiers and extrusion tips for depositing the metal-based alloy and corresponding support material. Examples of suitable designs for extrusion head 40 and liquefier portion 110 include those disclosed in LaBossiere, et al., U.S. Patent Application Publication No. 2007/0003656, entitled "Rapid Prototyping System With Controlled Material Feedstock"; LaBossiere, et al., U.S. patent application Ser. No. 11/396,845, entitled "Single-Motor Extrusion Head Having Multiple Extrusion Lines"; and Leavitt, U.S. patent application Ser. No. 11/888,076, entitled "Extrusion Head For Use In Extrusion-Based Layered Deposition System", where the components are fabricated from materials suitable for use in the elevated temperature of build chamber 14 (e.g., the materials discussed above for bearing sleeves 68a and 68b and drive belt 76. While liquefier portion 110 is shown with two liquefiers and extrusion tips, extrusion head 40 may alternatively be configured to extrude a single material (i.e., one liquefier and extrusion tip), or to extrude more than two materials (e.g., three to ten liquefiers and extrusion tips).

Figure 5:
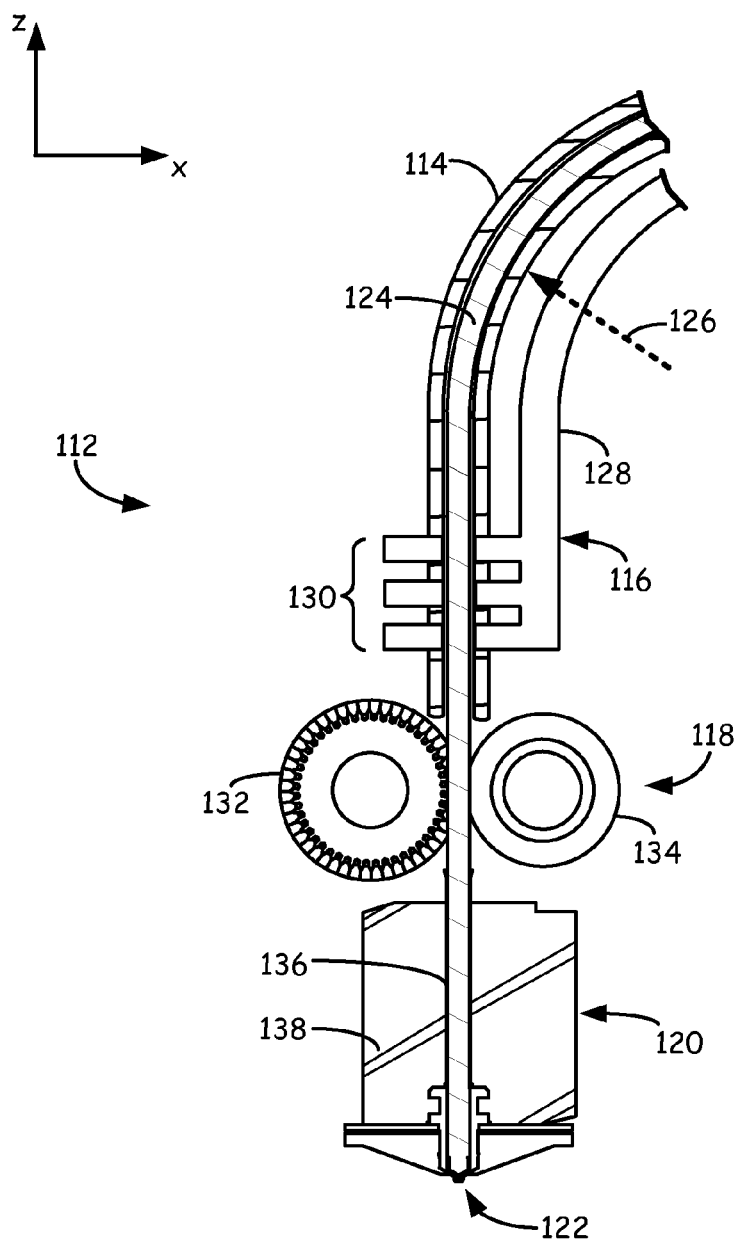
FIG. 5 if an expanded partial sectional view of an extrusion line of the extrusion head for extruding a metal-based alloy.

FIG. 5 is an expanded partial sectional view of extrusion line 112 of extrusion head 40 (shown in FIGS. 1-4) for extruding the metal-based alloy to build 3D object 22 (shown in FIG. 1). Extrusion line 112 includes feed tube 114, coolant assembly 116, drive mechanism 118, liquefier assembly 120, and extrusion tip 122. Feed tube 114 receives the metal-based alloy in a wire form (represented as wire 124) from a supply source of wire 124 located external to build chamber 14 (shown in FIG. 1), where wire 124 is supplied to extrusion head 40 through umbilical 56 (shown in FIGS. 2-4). The dimensions of wire 124 may vary depending on the metal-based alloy used, and on the dimensions and capabilities of feed tube 114, drive mechanism 118, and liquefier assembly 120. Examples of suitable average diameters for wire 124 range from about 0.508 millimeters (about 0.020 inches) to about 2.54 millimeters (about 0.100 inches). In embodiments in which wire 124 is substantially rigid due to the diameter, the radius of curvature of feed tube 114 (represented as radius 126) is desirably at least fifty times the diameter of wire 124 to reduce friction within feed tube 114.

Coolant assembly 116 includes duct portion 128 and porous sleeves 130, where duct portion 128 is a tube configured to relay a pressurized coolant gas to porous sleeves 130 from a supply source (not shown) located external to build chamber 14. Suitable coolant gases include the inert gases discussed above for build chamber 14 (e.g., argon). Porous sleeves 130 are a plurality of close-fitting, porous heat exchangers that extend through the wall of feed tube 114. This allows the coolant gas supplied from duct portion 128 to form a high-shear gas film against wire 124, thereby reducing the temperature of wire 124 prior to engaging with drive mechanism 118.

The coolant gas supplied through coolant assembly 116 is desirably used in addition to coolant gas flowing through umbilical 56, which assists in thermally isolating the interior region of umbilical 56 from the elevated temperature of build chamber 14. In comparison, the coolant gas relayed through coolant assembly 116 is desirably used to directly cool wire 124 prior to engagement with drive mechanism 118. The metal-based alloy of wire 124 has a high thermal conductivity. As such, when wire 124 resides in liquefier assembly 120 and is not presently being extruded, the upstream portions of wire 124 adjacent to drive mechanism 118 may heat up. This may soften the portions of wire 124 adjacent to drive mechanism 118, thereby potentially reducing the engagement between drive mechanism 118 and wire 124. Coolant assembly 116, however, lowers the temperature of wire 124 adjacent to drive mechanism 118, which preserves engagement between drive mechanism 118 and wire 124.

Drive mechanism 118 includes drive roller 132 and idler roller 134, which are configured to engage and grip wire 124. Drive roller 132 is desirably connected to a drive motor (not shown), which allows drive roller 132 and idler roller 134 to feed wire 124 into liquefier assembly 120. In one embodiment, the drive motor for drive mechanism 118 is disposed in extrusion head 40, and is thermally-isolated from build chamber 14 by the coolant gas provided through umbilical 56. Alternatively, the drive motor for drive mechanism 118 may be located externally to build chamber 14, and is interconnected with drive roller 132 via gear and/or belt mechanisms that extend through umbilical 56.

Liquefier assembly 120 is the portion of extrusion head 40 that is disposed in liquefier portion 110, and includes liquefier tube 136 and liquefier block 138. Liquefier tube 136 is a thin-wall, thermally conductive tube extending through liquefier block 138, which has an entrance adjacent drive mechanism 118, and an exit at extrusion tip 122. In one embodiment, coolant gas is also supplied adjacent to the entrance of liquefier tube 136 to prevent the upstream portions of wire 124 from heating up. Liquefier tube 136 provides a pathway for wire 124 to travel through liquefier block 138, and may include one or more inner-surface coatings to assist the flow of the metal-based alloy and to reduce the risk of chemical attacks between the metal-based alloy and liquefier assembly 120. Examples of suitable inner-surface coatings for liquefier tube 136 include carbide coatings, such as silicon carbides. Alternatively, liquefier tube 136 may be fabricated from stable materials, such as graphites and ceramics.

Liquefier block 138 is a heating block for melting wire 124 to a desired flow pattern based on a thermal profile along liquefier block 138. Due to the high thermal conductivity of the metal-based alloy (relative to thermoplastic materials), the length of thermal profile along liquefier block 138 may be reduced, which correspondingly reduces the flow response time during the build operation. Extrusion tip 122 is an extrusion tip secured to liquefier assembly 120, and has a tip diameter for depositing roads of the metal-based alloy, where the road widths and heights are based in part on the tip diameter. Examples of suitable tip diameters for extrusion tip 122 range from about 250 micrometers (about 10 mils) to about 510 micrometers (about 20 mils). In one embodiment, extrusion tip 122 includes a non-wetting ring to reduce the risk of the metal-based alloy from building up outside of extrusion tip 122.

The metal-based alloy is extruded through extrusion line 112 of extrusion head 40 by applying rotational power to drive roller 132 (from the drive motor). The frictional grip of drive roller 132 and idler roller 134 translates the rotational power to a drive pressure that is applied to wire 124. The drive pressure forces successive portions of wire 124 into liquefier tube 136, where the metal-based alloy is heated by liquefier block 138 to an extrudable state. As discussed below, the extrudable state is reached by heating the metal-based alloy to a semi-solid state of the metal-based alloy. This create a slush-like consistency for the metal-based alloy, which is suitable for extrusion. As further discussed below, in one embodiment, the metal-based alloy is heated to a temperature in the semi-solid state of the metal-based alloy that substantially preserves the original grain structure of wire 124 upon cooling (e.g., substantially free of dendrites), which preserves the physical properties of the original grain structure.

The unmelted portion of wire 124 functions as a piston with a viscosity-pump action to extrude the heated metal-based alloy through liquefier tube 136 and extrusion tip 122, thereby extruding the heated metal-based alloy. The drive pressure required to force wire 124 into liquefier tube 136 and extrude the metal-based alloy is based on multiple factors, such as the resistance to flow of the metal-based alloy, bearing friction of drive roller 132, the grip friction between drive roller 132 and idler roller 134, and other factors, all of which resist the drive pressure applied to wire 124 by drive roller 132 and idler roller 134.

The metal-based alloy is deposited in a predetermined pattern to build 3D object 22 in a layer-by-layer manner. As with extruded thermoplastic materials, the extrusion process of the metal-based alloy typically exhibits a self-planarization effect. This is due to the pressure feedback, where the previously deposited alloy causes an upstream-directed pressure against the alloy being extruded from extrusion tip 122. The pressure feedback is based on several factors such as cooling of the alloy being extruded by contact with the previously extruded and cooled alloy, back pressure from the alloy building up at extrusion tip 122, and changes in the effective time constant of liquefier assembly 120 due to constriction in extrusion tip 122. This pressure feedback modifies the engagement between wire 124 and drive roller 132/idler roller 134, which alters the extrusion rate of the metal-based alloy to induce the self-planarization effect. In an alternative embodiment, a separate planarizer assembly (not shown) may be incorporated into system 10 for providing an additional planarizing process for the layers or 3D object 22 and/or the corresponding support structure.

As discussed above, the temperature of build chamber 14 desirably allows the deposited metal-based alloy to cool to below the glass transition temperature of the alloy, thereby allowing the deposited alloy to retain its shape and support subsequently deposited layers. Moreover, the elevated temperature of build chamber 14 reduces the risk of mechanically distorting the deposited metal-based alloy as it cools in build chamber 14, despite the high thermal conductivity of the alloy. As such, 3D object 22 may be built with the metal-based alloy of wire 124, which exhibits good physical properties, while also substantially retaining the same desired deposition patterns that are attainable with deposited thermoplastic materials.

While extrusion head 40 is discussed above for a deposition process with a liquefier assembly, the extrusion line 112 may be replaced with a variety of different feedstock drive mechanism and liquefier arrangements. For example, system 10 may include one or more two-stage pump assemblies, such as those disclosed in Batchelder et al., U.S. Pat. No. 5,764,521; and Skubic et al., U.S. patent application Ser. No. 12/069,536. This embodiment is beneficial for placing the drive motors used to extrude the metal-based alloy outside of chamber walls 24, thereby thermally isolating the drive motors from the elevated temperature of build chamber 14. Alternatively, system 10 may include one or more freeze valve assemblies, such as those disclosed in Batchelder et al., U.S. Pat. No. 6,578,596.

Figure 6:
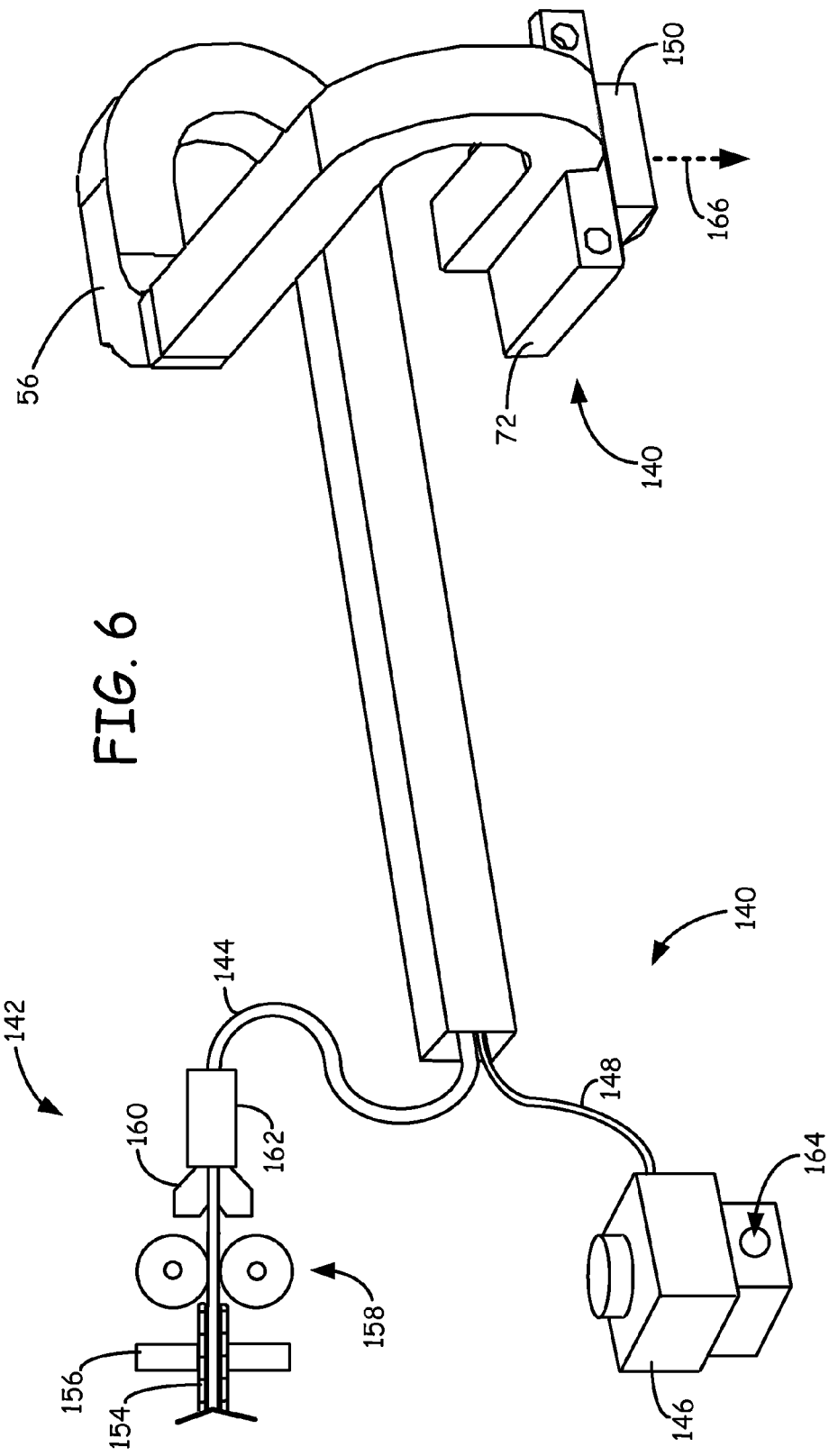
FIG. 6 is a front perspective view of a first alternative extrusion head of the digital manufacturing system in use with an umbilical of the digital manufacturing system, where the first alternative extrusion head has a hybrid liquefier/freeze valve design.

FIG. 6 is a front perspective view of extrusion head 140 in use with umbilical 56, where extrusion head 140 is an additional alternative to extrusion head 40 (shown in FIGS. 1-5) for use in system 10. In comparison to extrusion head 40, which includes extrusion line 112 (shown in FIG. 5), extrusion head 140 includes extrusion line 142, supply tube 144, coolant solenoid 146, coolant line 148, and freeze valve assembly 150. Accordingly, extrusion head 140 functions as a hybrid liquefier/freeze valve design where the metal-based alloy is heated to an extrudable state at extrusion line 142 and is deposited from freeze valve assembly 150.

Extrusion line 142 includes feed tube 154, coolant assembly 156, drive mechanism 158, liquefier assembly 160, and filter 162, where feed tube 154, coolant assembly 156, drive mechanism 158, and liquefier assembly 160 may function in the same manner as feed tube 114, coolant assembly 116, drive mechanism 118, and liquefier assembly 120 of extrusion line 112 (shown in FIG. 5). Extrusion line 142, however, is desirably located outside of chamber walls 24 (shown in FIG. 1), thereby thermally isolating extrusion line 142 from the elevated temperature of build chamber 14. This is beneficial for protecting temperature-sensitive components of extrusion line 142 (e.g., a drive motor for drive mechanism 158) from exposure to the elevated temperatures. Filter 162 is disposed downstream from liquefier assembly 160 and is configured to filter out residual impurities (e.g., oxides) carried by the heated metal-based alloy. Supply tube 144 extends through umbilical 56 and interconnects extrusion line 142 and freeze valve assembly 150. Thus, supply tube 144 relays the heated metal-based alloy from extrusion line 142 to freeze valve assembly 150.

Coolant solenoid 146 is also desirably located outside of build chamber 14, and is a flow control apparatus configured to regulate the flow of a coolant gas to freeze valve assembly 150 via coolant line 148. Coolant solenoid 146 includes gas inlet port 164, which is a port for receiving a pressurized coolant gas. Examples of suitable coolant gases for use with coolant solenoid 146 include the inert gases discussed above for build chamber 14 (e.g., argon). This allows a single source of inert gas to be used to supply the inert gas for build chamber 14, the coolant gas for umbilical 56, and the coolant gas for operating freeze valve assembly 150. Coolant solenoid 146 regulates the flow of the coolant gas to freeze valve assembly 150 (via coolant line 148) based on signals provided from controller 13 (shown in FIG. 1). Coolant line 148 extends through umbilical 56, and interconnects coolant solenoid 146 and freeze valve assembly 150 for relaying the flow of coolant air from coolant solenoid 146 to freeze valve assembly 150.

Freeze valve assembly 150 is a deposition assembly, such as those disclosed in Batchelder et al., U.S. Pat. No. 6,578, 596, which is retained by an x-y-axis gantry (e.g., x-y-axis gantry 38, shown in FIGS. 1-4) for movement around build chamber in the horizontal x-y plane. Freeze valve assembly 150 desirably includes a flow path tube (not shown), which has a high thermal resistance, for receiving and depositing the heated metal-based alloy from supply line 144. When the coolant gas from coolant line 148 is forced to flow around the outside of the flow path tube, the coolant gas draws heat from the tube and the metal-based alloy at a heat transfer rate that is greater than the rate that the tube is heated. This causes the tube to close, effectively blocking the flow of the metal-based alloy. When the flow of coolant gas is stopped (via coolant solenoid 146), the tube heats up and opens the flow path for the metal-based alloy. This allows the metal-based alloy to be deposited (represented by arrow 166) to form 3D object 22 (shown in FIG. 1) in a layer-by-layer manner.

Freeze valve assembly 150 is particularly suitable for use with the metal-based alloy due to the fast attainable response times. For example, the response time for operating freeze valve assembly 150 may be below one millisecond, which is substantially less than the response times attainable with thermoplastic materials (e.g., about 10 milliseconds). Furthermore, the hybrid liquefier/freeze valve design of extrusion head 140 allows the moveable components (e.g., coolant solenoid 146 and drive mechanism 158) to be located outside of build chamber 14, and reduces the number of temperature-sensitive components within build chamber 14. This accordingly increases the operational lives of the components of system 10.

Figure 7:
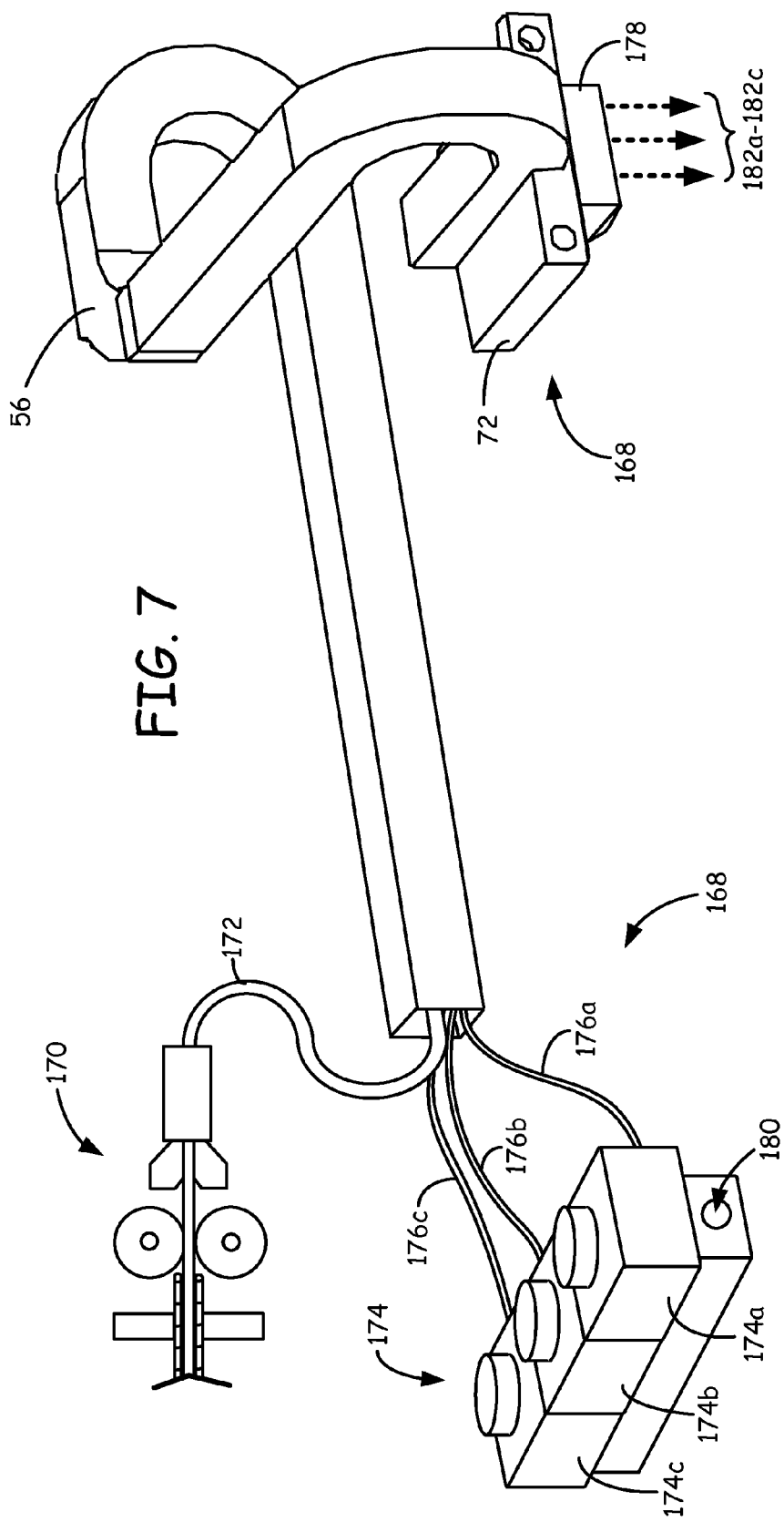
FIG. 7 is a front perspective view of a second alternative extrusion head of the digital manufacturing system in use with an umbilical of the digital manufacturing system, where the second alternative extrusion head has a hybrid liquefier/freeze valve design with multiple deposition lines.

FIG. 7 is a front perspective view of extrusion head 168 and umbilical 56, which illustrates an alternative to extrusion head 140 (shown in FIG. 6) for use in system 10. Extrusion head 168 functions in a similar manner to extrusion head 140, and includes extrusion line 170, supply tube 172, solenoid assembly 174, coolant lines 176a-176c, and freeze valve assembly 178. Extrusion line 170 and supply line 176 function in the same manner as extrusion line 142 and supply line 144 (shown in FIG. 6) for relaying the heated metal-based alloy through umbilical 56 to freeze valve assembly 178.

Solenoid assembly 174 includes coolant solenoids 174a-174c and gas inlet port 180, where each of coolant solenoids 174a-174c function in the same manner as coolant solenoid 146 (shown in FIG. 6), and gas inlet port 180 functions in the same manner as gas inlet port 164 (shown in FIG. 6). Accordingly, coolant solenoids 174a-174c regulate the flow of the coolant gases respectively through coolant lines 176a and 176c to freeze valve assembly 178 based on signals provided from controller 13 (shown in FIG. 1).

Freeze valve assembly 178 is a deposition assembly that functions in a similar manner to freeze valve assembly 150 (shown in FIG. 6). However, in comparison to freeze valve assembly 150, which included a single deposition line, freeze valve assembly 178 includes three separate deposition lines for depositing the metal-based alloy supplied from extrusion line 170. The three separate deposition lines are respectively controlled by the regulated coolant gas flow from coolant solenoids 174a-174c. This allows the metal-based alloy to be deposited in multiple, independent deposition lines (represented by arrows 182a-182c) to form 3D object 22 (shown in FIG. 1) in a layer-by-layer manner.

While extrusion head 168 is discussed above as including a single extrusion line (i.e., extrusion line 170), extrusion head 168 may alternatively include multiple extrusion lines for supplying multiple materials to freeze valve assembly 178. For example, extrusion head 168 may include an extrusion line for each coolant solenoid of solenoid assembly 174, such as one or more extrusion lines for metal-based alloys and one or more extrusion lines for support materials. Furthermore, while solenoid assembly 174 is disclosed with three coolant solenoids (i.e., coolant solenoids 174a-174c), solenoid assembly 174 may alternatively include a different number of coolant solenoids to deposit materials from freeze valve assembly 178. Examples of suitable numbers of coolant solenoids for solenoid assembly 174 range from one (i.e., coolant solenoid 146, shown in FIG. 6) to ten, with particularly suitable numbers ranging about two to six, and with even more particularly suitable numbers ranging from two to four.

FIG. 8 is a front perspective view of extrusion head 184 and umbilical 56, which illustrates an additional alternative to extrusion head 140 (shown in FIG. 6) for use in system 10. Extrusion head 184 functions in a similar manner to extrusion head 140, and includes extrusion line 186, supply tube 188, coolant solenoid 190, coolant line 192, and freeze valve assembly 194. In this embodiment, coolant solenoid 190, coolant line 192, and freeze valve assembly 194 function in the same manner as discussed above for coolant solenoid 146, coolant line 148, and freeze valve assembly 150 of extrusion head 140 (shown in FIG. 6). Extrusion line 186, however, is used in lieu of extrusion line 142 (shown in FIG. 6), where extrusion line 186 is a pump-based extrusion line that includes drive motor 196, coolant assembly 198, and liquefier assembly 200.

Drive motor 196 is a motor connected to liquefier assembly 200, and is thermally isolated from liquefier assembly 200 via coolant assembly 198. Liquefier assembly 200 is a screw-pump liquefier that includes reservoir 202, extrusion channel 204, screw 206, and vent 208. Reservoir 202 is a chamber in which a supply of metal-based alloy (referred to as alloy 210) is desirably heated to an extrudable state, and supplied to extrusion channel 204. Reservoir 202 also desirably includes layer 212 (e.g., a graphite layer), which floats on the heated supply of alloy 210. Layer 212 desirably reduces the risk of oxidation attacks on alloy 210, and may also function as a thermally-insulating layer to retain heat within reservoir 202. Because the metal-based alloy is heated to the extrudable state in reservoir 202, alloy 210 may be supplied to extrusion line 186 in a variety of media (e.g., powder, pellets, and wire).

Extrusion channel 204 is a channel for retaining screw 206, which connects to supply line 188. Screw 206 is an extrusion screw axially connected to drive motor 196, and drives alloy 210 through extrusion channel 204 to supply line 188. Vent 208 is a gas and liquid overflow vent, which reduces the risk of over-pressurizing extrusion channel 204 during operation. During operation, alloy 210 is driven through extrusion channel 204 and supply line 188 by the rotation of screw 206 to freeze valve assembly 194. Freeze valve assembly 194 then extrudes the heated metal-based alloy in response to the regulation flow of coolant air from coolant solenoid 190. This allows the metal-based alloy to be deposited (represented by arrow 214) to form 3D object 22 (shown in FIG. 1) in a layer-by-layer manner.

While extrusion head 184 is discussed above as including a single extrusion line (i.e., extrusion line 186) and a single coolant solenoid (i.e., coolant solenoid 190), extrusion head 184 may alternatively include multiple extrusion lines and/or multiple coolant solenoids for supplying multiple materials to freeze valve assembly 194, as discussed above for extrusion head 168 (shown in FIG. 7).

Figure 9:
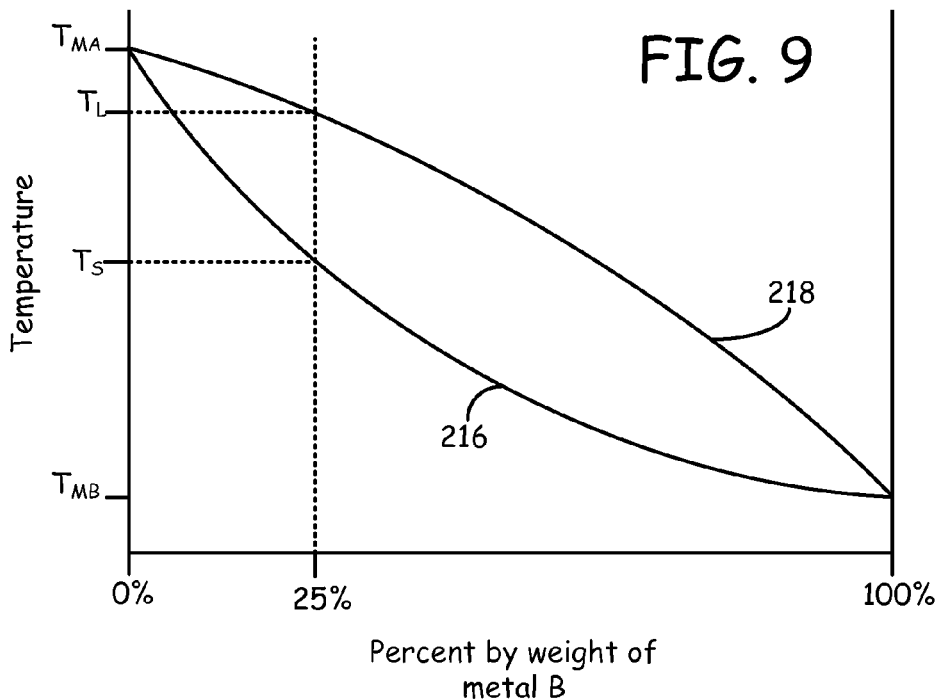
FIG. 9 is an exemplary binary phase diagram of temperature versus composition for metal-based alloys that are suitable for use with the digital manufacturing system.

FIG. 9 is a binary phase diagram of temperature versus composition for exemplary metal A and metal B, which illustrates suitable metal-based alloys for use with system 10 (shown in FIG. 1). All temperatures referred to herein are based on the pressure of build chamber 14 during the build operation (referred to as the "operating pressure"). As discussed above, the operating pressure may be under vacuum or partial-pressure conditions, pressurized with an inert gas above atmospheric pressure, or at atmospheric pressure with an inert gas.

As shown in FIG. 9, pure metal A (i.e., 0% by weight of metal B) has a melting temperature at $T_{MA}$, and pure metal B (i.e., 100% by weight of metal B) has a melting temperature at $T_{MB}$, where $T_{MA}$ is higher than $T_{MB}$. Thus, pure metals A and B switch between solid and liquid phases respectively at $T_{MA}$ and $T_{MB}$. However, at compositions between pure metals A and B, the metal-based alloys form a semi-solid phases between solidus curve 216 and liquidus curve 218. Below solidus curve 216, a metal-based alloy only exists in solid phase, and above liquidus curve 218, the metal-based alloy only exists in the liquid phase. However, in the semi-solid phase the metal-based alloy consists of solid crystals and liquid, thereby exhibiting a slush-like consistency.

For example, a metal-based alloy consisting of about 75% by weight metal A and about 25% of metal B has a solidus temperature $T_S$ and a liquidus temperature $T_L$. At temperatures below the solidus temperature $T_S$, the metal-based alloy exists in a solid phase and is not extrudable from system 10. Alternatively, at temperatures above the liquidus temperature $T_L$, the metal-based alloy exists in a liquid phase. The liquid phase also is not suitable for extruding the metal-based alloy to build a 3D object. The viscosity of the metal-based alloy in the liquid phase is not sufficient to retain its shape when deposited onto build platform 32 (shown in FIGS. 1 and 2), and is also not sufficient to support subsequently deposited layers.

Between the solidus temperature $T_S$ and the liquidus temperature $T_L$, however, the metal-based alloy exists in a semi-solid state, where the viscosity of the metal-base alloy decreases as the temperature increases from the solidus temperature $T_S$ to the liquidus temperature $T_L$. Accordingly, the metal-based alloy may be heated in system 10 to a viscosity that is suitable for extrusion from extrusion head 40 (shown in FIGS. 1-4), extrusion head 140 (shown in FIG. 6), extrusion head 168 (shown in FIG. 7), and/or extrusion head 184 (shown in FIG. 8). Examples of suitable viscosities for extruding the metal-based alloys range from about 1 poise to about 1,000 poise, with particularly suitable viscosities ranging from about 5 poise to about 500 poise, and with even more particularly suitable viscosities ranging from about 10 poise to about 100 poise.

Accordingly, suitable metal-based alloys for use with system 10 include any alloy containing two or more metal elements and that exhibits at least one semi-solid state (e.g., non-pure elements and non-eutectic alloys). Examples of suitable metal-based alloys include aluminum-silicon (AlSi) alloys, such as AlSi alloys including about 90% by weight to about 95% by weight aluminum, and about 5% by weight to about 10% by weight silicon. Such alloys exhibit relatively low liquidus temperatures, and have suitable ranges between their solidus and liquidus temperatures for viscosity control. Examples of suitable commercially available AlSi alloys include A356 and A357 casting alloys.

The suitable metal-based alloys are each desirably heated in system 10 to a temperature that provides a suitable viscosity within the semi-solid phase for extrusion. The metal-based alloys are desirably not heated above their liquidus temperatures during the processing within system 10. Heating a metal-based alloy above its liquidus temperatures and then cooling the alloy back down to its semi-solid phase substantially eliminates the original grain structure of the alloy, and forms dendrites upon cooling. Dendrite formation is also commonly found in models fabricated by conventional casting techniques, and reduces the physical properties of the metal-based alloy.

In contrast, the metal-based alloy used in system 10 is desirably heated up to a temperature within the range of suitable viscosities for extrusion, and that also provides a high concentration of solid crystals in the semi-solid phase. This substantially preserves the original grain structure of the raw material alloy wire during deposition and re-solidification, and reduces the formation of dendrites. Furthermore, in one embodiment, the metal-based alloy is heated treated prior to use with system 10. In this embodiment, the heat-treated, metal-based alloy is also heated up to a suitable temperature within the semi-solid phase for extrusion. After being deposited in a layer-by-layer manner and re-solidified, the alloy substantially retains its original heat-treated properties.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Figure 10:
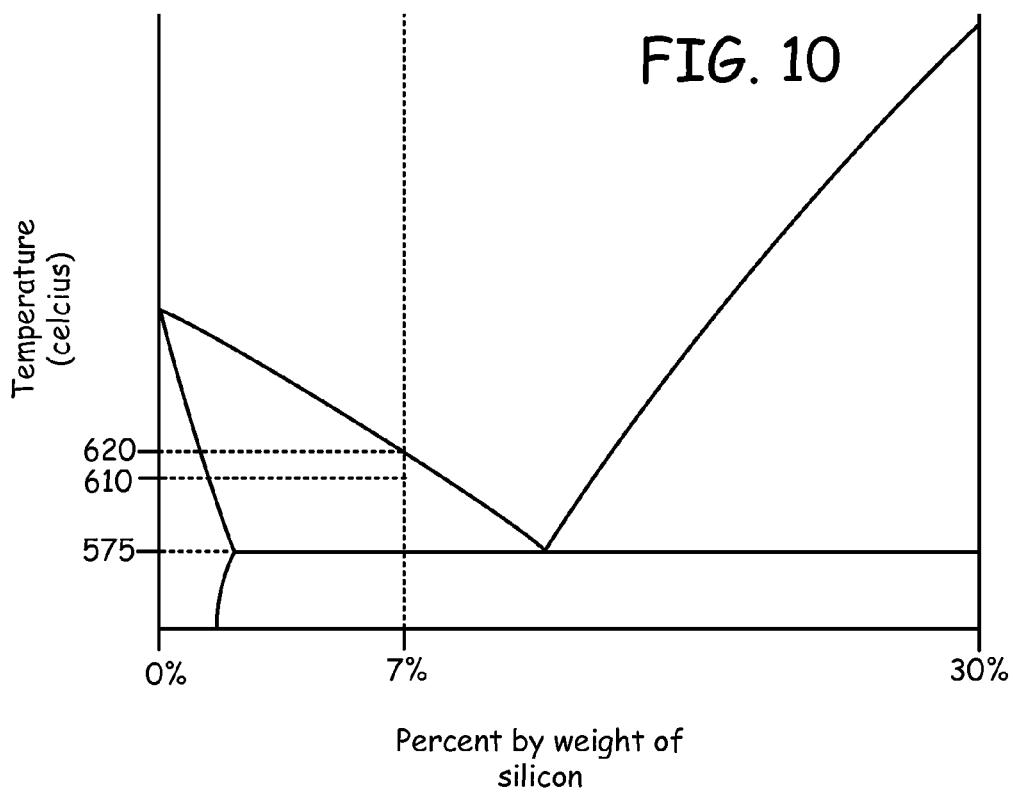
FIG. 10 is a partial binary phase diagram of temperature versus composition for aluminum and silicon, illustrating the temperature phase properties of an exemplary metal-based alloy for use with the digital manufacturing system.

An extrusion-based build operation was performed with an aluminum-silicon (AlSi) alloy from an extrusion head to determine the feasibility of attaining a semi-solid phase alloy having a viscosity that is suitable for extrusion. FIG. 10 is a partial binary phase diagram of temperature versus composition for aluminum and silicon, which illustrates the temperature phase profile for the AlSi alloy. The AlSi alloy included about 93% by weight aluminum and about 7% by weight silicon (i.e., AlSi Alloy A357), and had a solidus temperature of about 575° C. and a liquidus temperature of about 620° C.

The metallographic structure of the AlSi alloy was substantially free of dendrites, and exhibited silicon-particulate islands having an average diameter of about 14 micrometers. The alloy was heated to a temperature of about 610° C. and successfully extruded in a layer-by-layer manner to form a 3D object. An analysis of the AlSi alloy in the resulting 3D object showed that the AlSi alloy remained substantially free of dendrites. As such, heating the AlSi alloy up to a temperature within the semi-solid phase of the alloy substantially preserved the original grain structure of the alloy. Furthermore, the use of the AlSi alloy was also beneficial for preventing hydrogen gettering, which typically occurs at temperatures at or above about 650° C.

Figure 11:
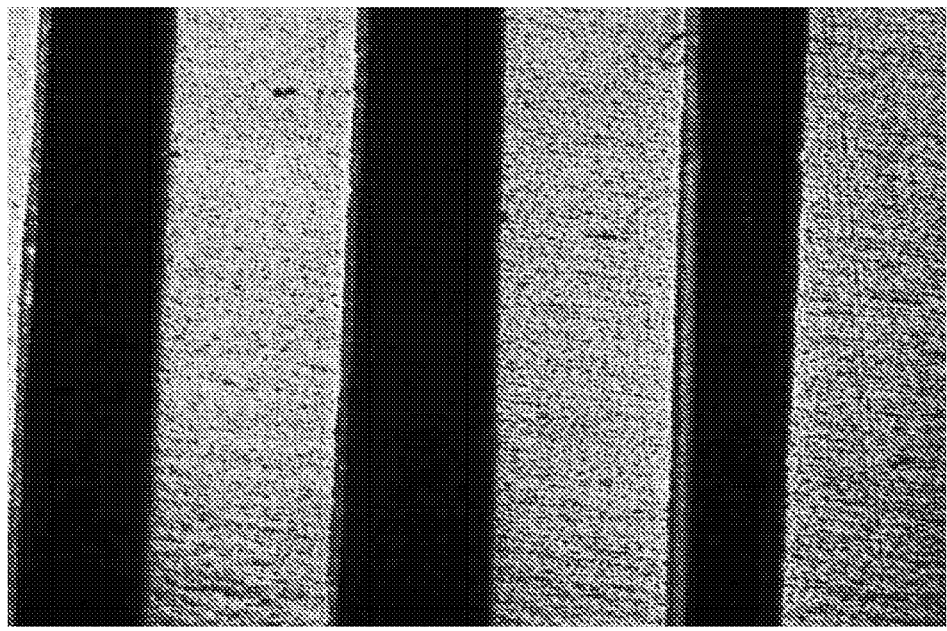
FIG. 11 is a micrograph of aluminum-silicon alloy wires prior to being subjected to extrusion temperatures.

Sample metals wires consisting of the AlSi alloy were also heated to extrusion temperatures below and above the liquidus temperature of the AlSi alloy to determine the effect of the temperature on the grain structure of the alloy. FIG. 11 is a micrograph of the AlSi alloy wires prior to being subjected to the extrusion temperatures. The wires shown in FIGS. 11-13 were each embedded in epoxy, lapped back to approximately the axes of the rods, polished, and etched to assist in viewing the grain structures of the alloys. As shown in FIG. 11, the AlSi alloy exhibited small average grain sizes, with evenly distributed silicon particles.

Figure 12:
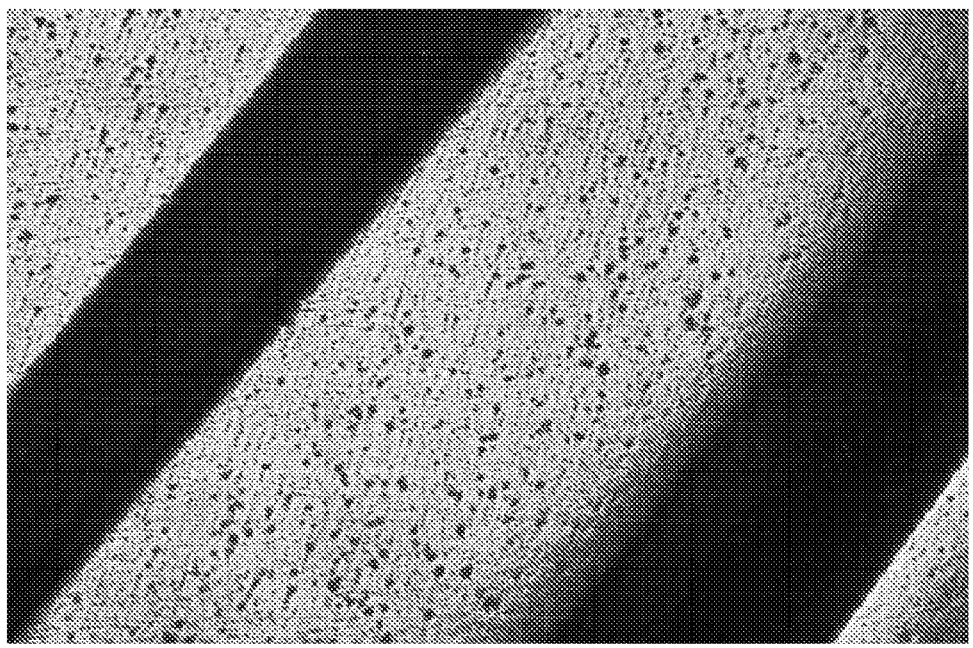
FIG. 12 is a micrograph of the aluminum-silicon alloy wires after being subjected to an extrusion temperature between the solidus and liquidus temperatures of the alloy.

A first set of the AlSi alloy wires were heated to an extrusion temperature of about 610° C., which placed the AlSi alloys of the wires in the semi-solid phase, for a duration of 30 minutes. FIG. 12 is a micrograph of the AlSi alloy wires after being heated up to the semi-solid phase and re-solidified. As shown, the resulting AlSi alloy was free of dendrites, and the silicon particles melted to form small conglomerates (about five silicon particles conglomerating into a single conglomerate particle). Thus, the original grain structure of the alloy was substantially preserved.

Figure 13:
FIG. 13 is a micrograph of the aluminum-silicon alloy wires after being subjected to an extrusion temperature above a liquidus temperature of the alloy.

A second set of the AlSi alloy wires were heated to a temperature above the liquidus temperature of the alloy (i.e., above about 620° C.), which completely melted the alloy. FIG. 13 is a micrograph of the AlSi alloy wires of Comparative Example A after being heated above the liquidus temperature and re-solidified. As shown, the resulting AlSi alloy exhibited large dendritic structures, which are typical in castings. Such dendritic structures can adversely affect the physical properties of the resulting alloys. In contrast, however, as shown in FIG. 12, heating the AlSi alloy up to a temperature that provides a viscosity suitable for extrusion, and that is within the semi-solid phase, allows the alloy to be extruded in a layer-by-layer manner to form a 3D object, where the resulting AlSi alloy of the 3D object substantially retains its original grain structure.

Although the present invention has been described with reference to preferred embodiments, workers skilled in the art will recognize that changes may be made in form and detail without departing from the spirit and scope of the invention.

The invention claimed is:

1. A method for building a three-dimensional object in a layer-by-layer manner with a digital manufacturing system, the method comprising:
    substantially removing oxygen-containing gases from a build chamber of the digital manufacturing system;
    heating the build chamber to one or more temperatures of at least about 400° C.;
    providing an alloy comprising aluminum;
    heating the alloy to a temperature that is above a solidus temperature of the alloy and that is below a liquidus temperature of the alloy;
    depositing the heated alloy in a predetermined pattern from a deposition head disposed at least partially within the build chamber onto a build platform—disposed within the build chamber
    controlling a flow of the alloy from the deposition head by selectively relaying a coolant from a coolant solenoid located outside of the build chamber to a freeze valve assembly of the deposition head disposed within the build chamber; and
    solidifying the deposited alloy.

2. The method of claim 1, wherein the one or more temperatures to which the build chamber is heated range from about 400° C. to about 700° C.

3. The method of claim 1, wherein the one or more temperatures to which the build chamber is heated range from about 500° C. to about 650° C.

4. The method of claim 1, wherein the alloy comprises from about 90% by weight to about 95% by weight of the aluminum, and from about 5% by weight to about 10% by weight silicon.

5. The method of claim 1, further comprising relaying the heated alloy from a location outside of the build chamber to the deposition head.

6. The method of claim 1, further comprising quenching the solidified alloy.

7. The method of claim 1, wherein the alloy is heated in at least one extrusion line disposed outside of the build chamber, and wherein the method further comprises driving the heated alloy from the at least one extrusion line to the deposition head through a thermally-isolating umbilical.

8. A method for building a three-dimensional object in a layer-by-layer manner with a digital manufacturing system, the method comprising:
    substantially removing oxygen-containing gases from a build chamber of the digital manufacturing system;
    heating the build chamber to one or more temperatures of at least 400° C.;
    providing a metal-based alloy;
    heating the alloy to a temperature that is above a solidus temperature of the alloy and that is below a liquidus temperature of the alloy;
    depositing the heated alloy in a predetermined pattern from a deposition head at least partially disposed within the build chamber onto a build platform disposed within the build chamber;
    controlling a flow of the alloy from the deposition head by selectively relaying a coolant from a coolant solenoid located outside of the build chamber to a freeze valve assembly of the deposition head disposed within the build chamber; and
    solidifying the deposited alloy.

9. The method of claim 8, wherein the one or more temperatures to which the build chamber is heated range from 400° C. to about 700° C.

10. The method of claim 8, wherein the one or more temperatures to which the build chamber is heated range from about 500° C. to about 650° C.

11. The method of claim 8, wherein the alloy comprises aluminum and silicon.

12. The method of claim 11, wherein the alloy comprises from about 90% by weight to about 95% by weight of the aluminum, and from about 5% by weight to about 10% by weight of the silicon.

13. The method of claim 8, wherein the method further comprises relaying the heated alloy from a location outside of the build chamber to the deposition head.

14. The method of claim 8, wherein the alloy is heated in at least one extrusion line disposed outside of the build chamber, and wherein the method further comprises driving the heated alloy from the at least one extrusion line to the deposition head through a thermally-isolating umbilical.

15. The method of claim 8, further comprising quenching the solidified alloy.

* * * * *